United States Patent Office 2,971,926
Patented Feb. 14, 1961

2,971,926
DEHYDROGENATION CATALYSTS

William D. Stillwell, Shaker Heights, Ohio, assignor to The Harshaw Chemical Company, Cleveland, Ohio, a corporation of Ohio No Drawing. Filed June 18, 1957, Ser. No. 666,492

3 Claims. (Cl. 252—441)

This invention relates to dehydrogenation catalysts and especially to those which are based upon iron as an essential component as well as to processes of effecting dehydrogenation of organic compounds by the use of such catalysts.

I am aware that prior to the present invention numerous iron catalysts have been proposed for dehydrogenation reactions and accordingly I do not claim such catalysts or the use thereof broadly. I have discovered, however, how to produce certain novel catalysts of this type which are highly effective and, indeed, superior to such known iron catalysts for some organic dehydrogenation reactions. These catalysts are produced at lower calcination temperatures than, and are thus actually cheaper than, many known iron dehydrogenation catalysts. Furthermore, the novel catalysts are more effective in the synthesis reactions at lower dehydrogenation temperatures.

Examples of reactions in which the novel catalysts are effective are dehydrogenation of butenes to butadiene and dehydrogenation of ethyl benzene to styrene. It is well known that by copolymerizing butadiene with styrene, a synthetic elastomer can be produced.

It is the principal object of the present invention to produce a novel catalyst of the iron, potassium, type capable of producing superior results in dehydrogenation reactions.

It has been discovered in accordance with the present invention that by the use of a fluorine compound in the formulation of the catalyst, it is possible to obtain maximum dehydrogenation and optimum surface area from a catalyst calcined at a lower temperature in the preparation, and that a higher crushing strength is obtained at a given calcination temperature. For example, in the case of catalysts otherwise identically formulated and prepared except that one contains in the formulation a fluoride and the other does not, the fluorine containing formulation will be found to attain maximum dehydrogenation properties at as much as one hundred centigrade degrees lower calcination temperature, the maxima being approximately the same. Further, the surface area of the fluorine formulation will be found to be reduced to a lower and more desirable surface area at any calcination temperature up to about 1,000° C. and the fluorine formulation will produce pellets of higher crushing strength up to a calcination temperature in the order of 900° C. which is higher than necessary or desirable to be used according to the invention and is above the point where the maximum crushing strength is exhibited although not as high as the point where the maximum is attained in the case of formulation not containing fluorine.

The formulation of the novel catalyst is essentially iron oxide, and oxides of potassium and preferably also chromium in the following preferred proportions, calculated as the oxides indicated in the following tabulations, it being understood that quantities of materials capable of yielding these relative amounts of the indicated oxides on calcination at 700° C. to 750° C. may be used.

| | Parts by weight |
|---|---|
| $Fe_2O_3$ | 60 to 85 |
| $K_2O$ | 10 to 30 |
| $Cr_2O_3$ | 0 to 10 |
| F | 2 to 10 |

Other ingredients may be present. For example, when the fluorine is introduced as a part of a compound or compounds other than as a part of one of the other normal components (e.g., $CaF_2$ or $ZnF_2$). These elements are neglected in calculating proportion limits.

The source of iron may be desirably an iron oxide or iron carbonate, the proportion limits above being calculated upon the amount of $Fe_2O_3$ contained or yielded upon calcination under oxidizing conditions at 700° C. to 750° C. The source of $K_2O$ may be $K_2O$, KOH, $K_2CO_3$, etc., again the above proportion being calculated on the $K_2O$ content. The source of the chromium may be $Cr_2O_3$, $CrO_3$, potassium chromate, potassium bichromate, etc., the above limits being based upon the $Cr_2O_3$ content. Suitable sources of fluorine are KF, $K_2SiF_6$, $NH_4HF_2$, $CaF_2$, $MgF_2$, $BaF_2$, $ZnF_2$, etc., the foregoing limits with respect to fluorine being based upon the fluorine content of the calcined product. It is thought that the fluorine content of the formulation is more important than the fluorine content of the calcined catalyst. It is certain that a substantial part of the fluorine content of the formulation is volatilized and it is believed that such fluorine is lost only after it has performed an important function in determining the physical structure of the catalyst.

The preparation of the catalyst may be carried out by mixing the ingredients in the proportions indicated above and with sufficient lubricant, (water, oil or the like) to provide for extrusion consistency and then extruding the mixture and calcining the extrusions at the indicated temperature of 700° C. to 750° C. Even lower temperatures down to 500° C. can be used with a fair degree of success, 600° C. being quite feasible although as indicated 700° C. to 750° C. is to be preferred in most cases. If tablets are desired, the usual tabletting lubricant may be added and the mix may be tabletted and then calcined. Usually, extrusions will be preferred as being cheaper.

To show the superiority in crushing strength of the catalyst prepared according to the method described herein, and to show its influence upon the temperature of synthesizing butadiene from butene-1, a commercially available catalyst identified as catalyst A and having the following analysis of main constituents:

| | Percent |
|---|---|
| $Fe_2O_3$ | 82.7 |
| $Cr_2O_3$ | 2.2 |
| $K_2O$ | 12.2 | was employed in an extruded form (about ⅛″ extrusions) for the dehydrogenation of butene-1 to form butadiene under the following synthesis conditions:

| | |
|---|---|
| Butene feed | 800 v./v.cat./hr. |
| Steam/butene ratio | 10/1. |
| Temperature | See Table I. |
| Catalyst | 50 ml. |

Table I

| Synthesis Temp. (° C.): | Conversion (Percent) |
|---|---|
| 604 | 17.5 |
| 625 | 24.0 |
| 665 | 31.4 |
| 670 | 33.0 |
| 680 | 18.0 |

From the information set forth in Table I, it is apparent that the commercially available catalyst, catalyst A, which was calcined at 925° C. in the preparation had a maximum conversion of about 33% (weight percent of butene-1 into butadiene) at a synthesis temperature of about 670° C. when operating under the other indicated synthesis conditions.

To illustrate the effect that the temperature of calcination has upon the crushing strength of extruded catalyst (identified as plain) similar to catalyst A in analysis and upon the conversion efficiency of such catalysts in dehydrogenation reactions, and to compare the results of similar treatments upon catalysts containing fluorine according to the invention, 16.3 kg. of $FeSO_4.7H_2O$ was dissolved in 23.7 kg. of $H_2O$ and reacted with 7.44 kg. of $Na_2CO_3$ as dissolved in 18.6 kg. of $H_2O$. The precipitate was thoroughly washed and dried and thereafter divided into two equal portions. To each portion was added 254.3 grams of $K_2Cr_2O_7$ and 618.1 grams of KOH and mixed therewith. To one portion, there was additionally added 154.5 grams of KF. Both portions were then extruded through a 1/8" die and samples thereof calcined as indicated in Table II, analysed and subjected to identical crushing tests.

Table II

| Catalyst No. | Calcination Temp. (° C.) | Analysis | | | | Crushing Strength | |
|---|---|---|---|---|---|---|---|
| | | $Fe_2O_3$ | $K_2O$ | $Cr_2O_3$ | F | Plain [1] | Fluorine [2] |
| 1P | 100 | 72.0 | 8.7 | 2.2 | | 21 | |
| 1KF | 100 | 66.8 | 9.8 | 2.1 | 2.6 | | 40 |
| 2P | 500 | | | | | 23 | |
| 2KF | 500 | 75.8 | 14.2 | 2.4 | 2.4 | | 29 |
| 3P | 550 | | | | | 25 | |
| 3KF | 550 | 77.0 | 14.8 | 2.4 | 2.4 | | 28 |
| 4P | 600 | | | | | 21 | |
| 4KF | 600 | 78.6 | 15.0 | 2.4 | 2.5 | | 33 |
| 5P | 650 | | | | | 31 | |
| 5KF | 650 | 79.4 | 13.9 | 2.4 | 2.5 | | 40 |
| 6P | 700 | | | | | 24 | |
| 6KF | 700 | 79.7 | 14.4 | 2.3 | 2.6 | | 46 |
| 7P | 750 | | | | | 30 | |
| 7KF | 750 | 79.1 | 12.3 | 2.4 | 2.5 | | 54 |
| 8P | 800 | | | | | 30 | |
| 8KF | 800 | 79.8 | 13.5 | 2.4 | 2.3 | | 58 |
| 9P | 850 | | | | | 38 | |
| 9KF | 850 | 80.7 | 13.5 | 2.4 | 2.3 | | 72 |
| 10P | 900 | 84.9 | 10.0 | 2.4 | | 40 | |
| 10KF | 900 | 81.2 | 10.1 | 2.3 | 1.8 | | 40 |
| 11P | 950 | 85.6 | 9.0 | 2.8 | | 53 | |
| 11KF | 950 | 80.8 | 12.2 | 2.5 | 1.9 | | 43 |

[1] Plain=Similar to Catalyst A in analysis.
[2] Fluorine=Fluorine containing catalyst.

The material set forth in Table II clearly shows the general superiority of catalysts containing fluorine insofar as they have superior crushing strengths when calcined up to calcination temperatures of the order of magnitude of about 900° C. It will also be noted that especially superior crushing strengths are obtained when the fluorine containing catalysts are calcined in the range from about 700° C. to about 850° C.

Certain of the catalysts identified in Table II were then employed for the dehydrogenation of butene-1 to form butadiene under the following synthesis conditions:

Butene feed _____ 600 v./v. cat./hr.
Steam/butene/ratio _____ 10/1.
Temperature _____ See Table III.
Catalyst _____ 50 ml.

Table III indicates the conversion in weight percent of butene-1 into butadiene and illustrates that superior activity is obtained from fluorine containing iron catalyst which are calcined at temperatures of about 700° C. as compared with similar fluorine containing iron catalyst calcined at 800° C. Thus superior activities may be obtained in butadiene synthesis reactions when the fluorine containing catalysts are calcined at temperatures ranging from about 700° C. to about 750° C., and it will be apparent that the calcination may be effected during the actual synthesis. Thus, even lower temperatures down to 500° C. can be used with fair degree of success since the subjection of the catalyst to the conditions of the synthesis reaction will in effect also produce calcination at the higher temperatures thereof.

Table III also indicates the superior conversions obtained from fluorine containing iron catalyst calcined at about 700° C. when employed for dehydrogenating butene-1 to butadiene at synthesis temperatures ranging from about 590° C. to 610° C. when compared with the commercial catalysts, catalyst A, of similar analysis except not having a fluorine content.

Table III

| Catalyst No. | Calcination Temp. (° C.) | Synthesis Temp. (° C.) | Conversion, Percent |
|---|---|---|---|
| 6P | 700 | 590 | 17.2 |
| 6KF | 700 | 590 | 24 |
| Cat A | 925 | 590 | 17.0 |
| 6KF | 700 | 610 | 24.7 |
| Cat A | 925 | 610 | 20.8 |
| 6P | 700 | 644 | 20.9 |
| 6KF | 700 | 644 | 21.2 |
| Cat A | 925 | 644 | 23.2 |
| 8P | 800 | 610 | 20.3 |
| 8P | 800 | 614 | 3.4 |
| 8KF | 800 | 614 | 21.6 |
| Cat A | 925 | 614 | — |
| 10KF | 900 | 670 | 9.8 |
| Cat A | 925 | 670 | 20.7 |

Mono-olefins and/or alkylated aromatic hydrocarbons may be passed over catalysts prepared according to the foregoing together with steam at gas space velocities of, for example 600 to 800, at a steam/butene ratio of 10:1, at a synthesis temperature in the range of from 575° C. to 625° C. (preferably 590° C. to 610° C.) and with good conversion rates. These are but examples of the use of the novel catalyst and it is to be understood that the novel catalyst can be used under other conditions for dehydrogenation for other mono-olefins and alkyl benzenes and with similar results.

This application is a continuation-in-part of my prior application for patent Serial No. 569,692, filed March 6, 1956, now abandoned.

I claim:

1. As a new catalyst characterized by low surface area and high crushing strength, the calcination product of a four component mixture of iron, potassium, chromium and fluorine compounds, said fluorine compound being selected from the class consisting of KF, $K_2SiF_6$, $CaF_2$, $MgF_2$, $BaF_2$, and $ZnF_2$ in amounts capable of yielding from 2 to 10 parts by weight of fluorine in the calcined product, said iron compound being selected from the class consisting of iron oxide and iron carbonate in amounts capable of yielding from 60 to 80 parts by weight $Fe_2O_3$ in the calcined product, said potassium compound being selected from the class consisting of $K_2O$, KOH, and $K_2CO_3$, in amounts capable of yielding 10 to 30 parts by weight $K_2O$ in the calcined product and said chromium compound being selected from the class consisting of $Cr_2O_3$, $CrO_3$, $K_2CrO_4$ and $K_2Cr_2O_7$ in amounts capable of yielding from 2 to 10 parts by weight $Cr_2O_3$ in the calcined product.

2. A catalyst as defined in claim 1 wherein the fluorine is added in the form of KF.

3. The method of making a composite catalyst characterized by a low surface area and high crushing strength comprising calcining a four component mixture of iron, potassium, chromium and fluorine compounds at a temperature from 700° C. to 750° C., said fluorine compound being selected from the class consisting of KF, $K_2SiF_6$, $CaF_2$, $MgF_2$, $BaF_2$, and $ZnF_2$ in amounts capable of yielding from 2 to 10 parts by weight of fluorine in the calcined product, said iron compound being selected from the class consisting of iron oxide and iron carbonate in amounts capable of yielding from 60 to 80 parts by weight $Fe_2O_3$ in the calcined product, said potassium compound being selected from the class consisting of $K_2O$, and KOH, $K_2CO_3$, in amounts capable of yielding 10 to 30 parts by weight $K_2O$ in the calcined product and said chromium compound being selected from the class consisting of $Cr_2O_3$, $CrO_3$, $K_2CrO_4$ and $K_2Cr_2O_7$ in amounts capable of yielding from 2 to 10 parts by weight $Cr_2O_3$ in the calcined product.

References Cited in the file of this patent

UNITED STATES PATENTS

| | | |
|---|---|---|
| 1,216,993 | Bosch et al. | Feb. 20, 1917 |
| 2,383,643 | Fulton et al. | Aug. 28, 1945 |
| 2,408,140 | Gutzeit | Sept. 24, 1946 |
| 2,414,585 | Eggersten et al. | Jan. 21, 1947 |
| 2,426,829 | Kearby | Sept. 2, 1947 |
| 2,461,147 | Davies et al. | Feb. 8, 1949 |
| 2,666,086 | Pitzer | Jan. 12, 1954 |
| 2,813,137 | Twaddle et al. | Nov. 12, 1957 |
| 2,866,791 | Pitzer | Dec. 30, 1958 |